Dec. 12, 1967     H. BELOFSKY     3,357,866
THERMOELECTRIC GENERATOR
Filed Jan. 28, 1965     2 Sheets-Sheet 1

INVENTOR.
HAROLD BELOFSKY

BY

Dec. 12, 1967 H. BELOFSKY 3,357,866
THERMOELECTRIC GENERATOR
Filed Jan. 28, 1965 2 Sheets-Sheet 2
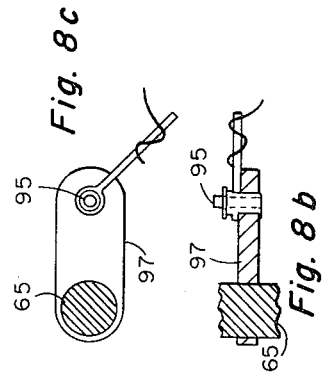
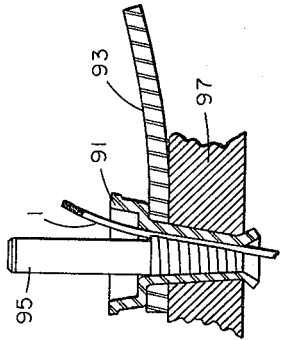
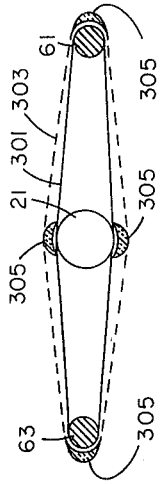
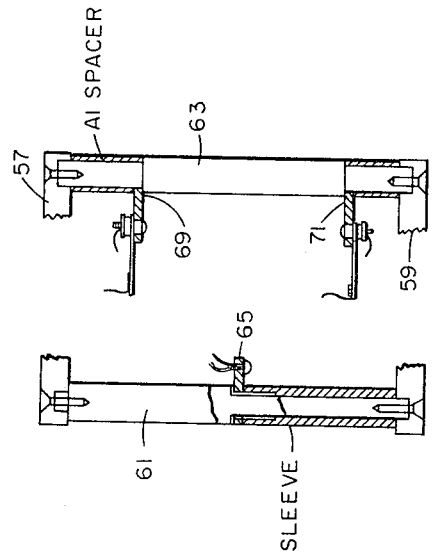
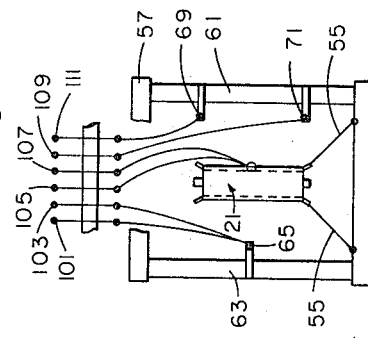
INVENTOR.
HAROLD BELOFSKY
BY United States Patent Office 3,357,866
Patented Dec. 12, 1967

3,357,866
THERMOELECTRIC GENERATOR
Harold Belofsky, Verona, N.J., assignor to the United States of America as represented by the United States Atomic Energy Commission
Filed Jan. 28, 1965, Ser. No. 428,888
3 Claims. (Cl. 136—202)

ABSTRACT OF THE DISCLOSURE

Thermoelectric generator for producing high voltage, milliwatt power from high thermal gradient series connected duplex thermocouple wire wound in a continuous spiral around cold posts spanning the volume from end to end and adjacent the inside diameter of an evacuated thermal insulation containing, cylindrical container having a right circular cross-section, cylindrical, radioactive material containing heat source whose outside cylindrical surface is tangent to the inside of the continuous spiral formed by the thermocouple wire and which is supported from its opposite ends at the center of the container by thin, high strength low thermal conductivity supports having resilient mountings at the inside ends of the cylindrical container.

---

This invention relates to electrical power generation and in particular, to novel radioisotope heated thermoelectric generator apparatus and method for making the same.

In radioisotope heated thermoelectric generators, hereinafter referred to as RTG's, it has been desirable to conserve the radioactive source heat for providing large temperature gradients across the thermocouples for providing a high voltage, milliwatt power output. Heretofore, however, large heat flow from the source through the thermocouples or from the source to the RTG container has made it difficult or impossible to conserve the source heat or efficiently to provide a high temperature gradient across the thermocouples. Moreover, the thermocouples have often been unreliable or have been difficult or expensive to assemble and use, have had unreliable welded, twisted or brazed junctions, or have comprised semiconductors that have not been suitable for high voltage, milliwatt power outputs.

It is an object of this invention, therefore, to provide an economical and practical RTG apparatus for the generation of electrical power by providing means for insulating the heat source from the RTG container to conserve the source heat;

It is a further object to provide means for supporting the radioisotope heat source and arranging the thermocouples therewith in such a way as to provide a large temperature gradient across the thermocouples and low heat losses from the source through the auxiliary structure;

It is a further object to provide an efficient radioisotope heat source for providing hot and cold thermocouple junctions, and tension in the thermocouples for holding the thermocouples in contact with the heat source;

A further object is to provide an RTG system with a selectively insertable radioisotope source for insertion after the thermocouples are installed;

A further object is to provide an RTG having an effective thermal insulation around the radioisotope source;

A further object is to provide an RTG having a source suspended by thin wires so as to conserve the source heat;

Another object is to provide a single length of clad thermocouple wire wound in a continuous spiral around a radioisotope heat source and tangent to the source and intermittently electropolished in situ so as to provide two thermocouples for each turn of wire;

Another object is to provide metallic thermocouples for efficiently providing a high voltage, milliwatt power output;

A further object is to provide a method for producing a low thermal conductivity, continuous, sequentially clad, duplex thermocouple wire;

A still further object is to provide continuous, sequentially clad, low thermal conductivity, duplex thermocouple wire for an RTG.

The foregoing objects are achieved by providing low thermal conductivity, high thermocouple E.M.F. thermocouple wire in point contact with an insulated hot or radioisotope heated second post, whereby the heat flow from the source through the thermocouples is efficiently directed so as to conserve the heat of the heat source and to provide a large temperature gradient across the thermocouples. More particularly, this invention involves locating the source in a closed container having low thermal conductivity insulating means between the source and container and using a thin continuous, end-to-end, coil of series-connected, closely but accurately spaced, thermocouples tangent to the hot post for the conservation of the source heat and the production of a high temperature gradient across the thermocouples. With the proper selection of clad thermocouple materials and method for producing the junctions, as hereinafter more particularly to be described, the desired high thermoelectric efficiency and source heat conservation for the production of milliwatt electrical power output is provided in a simple, efficient, easy-to-handle and trouble-free manner.

The above and further novel features and objects, of this invention will appear from the following detailed description when the same is read in connection with the accompanying drawings. It is to be expressly understood, however, that the drawings are not intended as a definition of the invention but are for the purpose of illustration only.

FIG. 7a is a partial cross-section of one cold post assembly of FIG. 5;

FIG. 7b is a partial cross-section of the other cold post assembly of FIG. 5;

FIG. 8a is a partial cross-section of the wire terminal assembly and insulating lug of FIG. 5;

FIG. 8b is a partial cross-section of the connector for the cold post of FIG. 8a;

FIG. 8c is a partial top view of the connector of FIG. 8b;

FIG. 9 is a partial schematic view of the wiring diagram of the RTG of FIG. 5;

FIG. 11 is a partial cross-section of another embodiment of the thermocouple of this invention.

Figure 1:
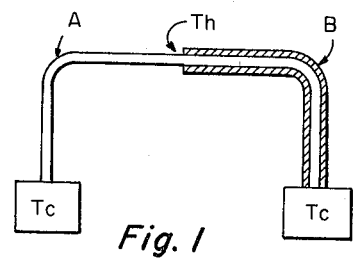
FIG. 1 is a partial schematic view of a single thermocouple pair.

In order to explain how the thermocouples of this invention accomplish the function of generating electrical power, reference is made to FIG. 1, which is a schematic illustration of a single thermocouple pair. Leg A has a core material that forms an unclad first thermocouple leg A, and leg B has a core material and a cladding material that forms a clad second thermocouple leg B having a first common hot junction $T_h$ with leg A. These legs A and B have separate cold junctions $T_c$ and, as will be understood in more detail hereinafter, these cold junctions provide series connected cold junctions.

Figure 2:
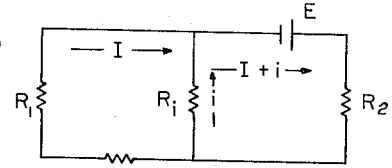
FIG. 2 is a partial schematic diagram of an equivalent electric circuit for the thermocouple pair of FIG. 1.

For optimizing the design of this type of energy conversion device and predicting thermoelectric efficiency reference is made to FIG. 2, which is an equivalent circuit that lumps the various distributed circuit parameters for convenient network analysis.

From the loop equations, $$IR_L + IR_1 - iR_1 = 0 \quad (2.1)$$

$$E - (I+i)R_2 - iR_1 = 0 \quad (2.2)$$

where $E$ = thermoelectric EMF of the couple formed by joining the dissimilar materials. Note that E is not equal to the open circuit voltage of the couple because of the voltage drop $iR_2$, which occurs in the open-circuit condition (when $I=0$). If the Seebeck coefficients of the two materials relative to a common reference metal are $+\alpha_1$, and $-\alpha_2$, then $$E = (\alpha_1 + \alpha_2)(T_h - T_c) = \alpha \Delta T$$

or $$\alpha = \frac{E}{\Delta T}$$

The apparent Seebeck coefficient of the thermocouple will be defined as $$\alpha' = \frac{V_{oc}}{\Delta T}$$

where $\Delta T = T_h - T_c$ and $V_{oc}$ = open circuit voltage.

From the above Equations 2.1 and 2.2, the load voltage is $$V_L = \frac{R_1(E - IR_1 - 2IR_2)}{R_1 + R_2}$$

For the open circuit condition, $I=0$, and $$V_{oc} = \frac{ER_1}{R_1 + R_2} \quad (2.6)$$

showing that $V_{oc}$ is dependent on geometric features as well as materials properties.

If we define the resistance ratio $X = R_1/R_2$, where $R_1$ = resistance of the base wire length $(N)(L)$ and $R_2$ = resistance of the cladding wire in length $(N)(L)$, the couple resistance becomes:

$$R = \frac{R_2 X(X+2)}{(X+1)}$$

From Equation 2.6 the open-circuit voltage $V_{oc}$ in terms of X is given by $$V_{oc} = \frac{EX}{X+1} \quad (2.9)$$

Equation 2.9 gives the open-circuit voltage of the thermocouple as a function of the geometry parameter X and the couple EMF E which equals $\alpha \Delta T$.

The derivation of the theory of the thermocouple, leading to the equivalent circuit of FIGURE 2, has been experimentally vertified. In this regard three thermocouples in series were fabricated consisting of Nichrome wire as core material, plated with nickel.

$V_{oc}$ was measured by a digital millivoltmeter with hot and cold junction temperatures of 520° C. and 80° C., respectively. The average value of the apparent Seebeck coefficient was $$\alpha' = \frac{V_{oc}}{T} = 25.8 \ \mu v./°C.$$

per couple wire diameters were determined using a bench micrometer accurate to .00005 inch. Average values were as follows:

$d_1$ = diameter Nichrome core = .00483 inch
$d_2$ = diameter plated Nichrome leg = .00850 inch
$X$ = 10.34

For comparison the Seebeck coefficients for a nickel and Nichrome pair were measured in the same test apparatus with a .005 inch diameter nickel and Nichrome twisted pair thermocouple. The measured thermoelectric output was 28.2 microvolts/° C. Using this value, and the same value for X as above, gives the calculated value for the apparent Seebeck coefficient of a nickel Nichrome duplex thermocouple of this invention equal to 25.7 microvolts/° C. This agrees almost exactly with the experimentally measured value thereby confirming the theory.

The criteria for selection of useful metals and metallic alloys are the thermoelectric properties (resistivity, Seebeck coefficient, thermal conductivity) and certain mechanical properties related to wire fabrication problems. The number of metals and alloys that are suitable are limited since there are many materials with large Seebeck coefficients, but most of these have other serious defects such as high thermal conductivity, poor mechanical properties, low melting points or extreme rarity. In some cases, the thermoelectric properties are strong functions of temperature and are not suitable in the desired operating temperature range.

The results of the search for materials to operate in the temperature range between 500° C. and 100° C. with a melting point of not less than 900° C. and fabricability into thermocouple wires, comprises six positive and six negative materials that can be made into 36 different combinations. Suitable positive materials and combinations, comprise Ni, Mo, Mn; Ni, Cr; chromium; tungsten; iridium. Suitable negative materials and combinations, comprise Pd, Au; Ni, Cu; Mn; Ni, Cn; cobalt; nickel; Ni, Al; Mn, Si. The results for ten combinations showing high efficiencies is as follows:

COMPARISON OF IDEALIZED GENERATORS WITH VARIOUS MATERIALS COMBINATIONS

| No. | Core Wire | Cladding | Combined Fig. of Merit (° K.⁻¹)×10⁻³ | Optimum $\eta_{TE}$, percent | No. of Couples (N) | Optimum Core Diam. (mils) | Optimum Cladding Thickness (mils) |
|---|---|---|---|---|---|---|---|
| 1 | 79 Ni, 20 Mo | Constantan | .0563 | .537 | 332 | 1.019 | .315 |
| 2 | #20 Alloy 82 Ni/17 Mo | do | .0491 | .470 | 335 | 1.053 | .309 |
| 3 | Chromel-P | do | .0397 | .381 | 363 | 1.000 | .374 |
| 4 | #20 Alloy | Platinel-1503 | .0375 | .360 | 400 | 1.120 | .218 |
| 5 | Cupron Special | Chromel-P | .0367 | .352 | 383 | .776 | .573 |
| 6 | do | Chromium | .0339 | .326 | 425 | .813 | .264 |
| 7 | 79 Ni, 20 Mo, 1 Mn | Cobalt | .0330 | .317 | 476 | 1.205 | .218 |
| 8 | Tungsten | Constantan | .0330 | .298 | 420 | .418 | .573 |
| 9 | Chromel-P | Platinel-1503 | .0301 | .290 | 411 | 1.055 | .252 |
| 10 | #20 Alloy | Cobalt | .0268 | .258 | 528 | 1.270 | .230 |

In the above table, one advantageous constantan is the Cupron Special brand of constantan alloy comprising 55 cu and 45 Ni; and the #20 alloy, comprises an optimum of 79 Ni, 20 Mo and 1 Mn. Cupron Special is the trade name of W. B. Driver Co., Newark, N.J., and is a quality-controlled constantan but any commercially available constantan of this alloy may be used. The #20 alloy is a designation by W. B. Driver Co. for their nickelmoly. alloy described but any commercially available alloy of this composition may be used.

The choices for maximum efficiency and minimum number of couples are the first two combinations. Both use constantan for cladding and nickel/molybdenum alloy for core wire. The Ni/Mo alloy is chosen for core material for several reason; its resistivity is higher than constantan, giving a larger core diameter than if the core and cladding materials were reversed; and, its tensile strength is much greater than constantan so that coils can be made with closer wound spacings which require greater winding tension. In addition, the Ni/Mo core is unaffected by the electropolishing solution used to remove the constantan cladding. Thus, the electropolishing operation control is less critical, since there is little danger of undercutting the core by polishing for to long a time.

Figure 4:
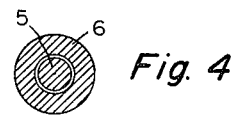
FIG. 4 is a partial cross-section of the apparatus of FIG. 3 through IV—IV.
Figure 3:
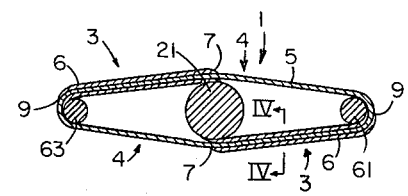
FIG. 3 is a partial cross-section of one turn of the thermocouple wire of this invention.

Referring to FIGS. 3 and 4, the metallic thermocouple of this invention, provides a large number of individual jointless thermocouples with little or no reliability or thermal conductivity problems associated with conventional welded, brazed, or twisted wire junctions or semiconductor thermocouples. This thermocouple system provides a large number of couples in series and the thermocouple wire is, of necessity, very small in diameter in order to obtain reasonable efficiency at milliwatt output power. To this end the wire diameter required is .001 to .002 inch. As shown in FIG. 3 this thermocouple system 1, comprises clad portions 3 and unclad portions 4. As shown in FIG. 4, the clad portion, comprises an inner solid metallic core 5 and an outer solid, metallic, concentric, cylindrical cladding 6. The two materials are relatively opposite in sign of their thermoelectric EMF for providing hot junctions 7 and cold junctions 9.

Figure 6:
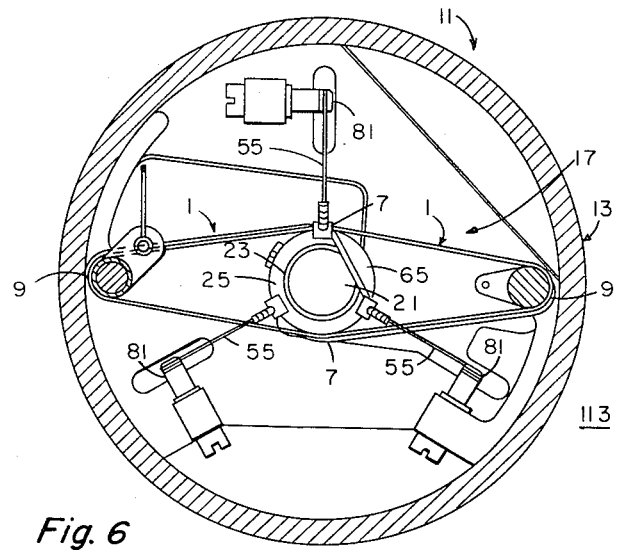
FIG. 6 is a partial cross-section of the apparatus of FIG. 5 through VI—VI.
Figure 5:
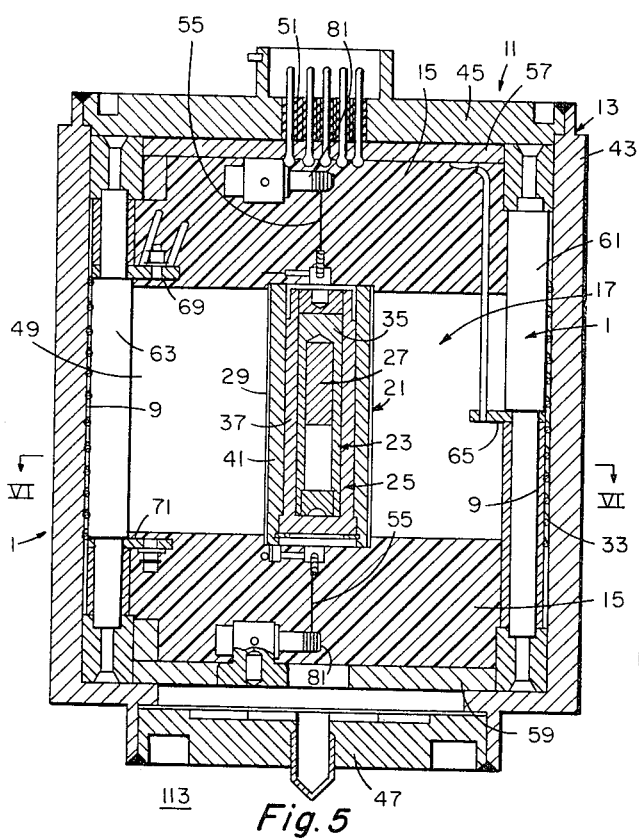
FIG. 5 is a partial cross-section of an RTG incorporating the thermocouple system of this invention.

Referring to FIGS. 5 and 6, an embodiment of an RTG 11 is shown comprising a case system 13 containing thermal insulation 15 and a converter 17 in which are incorporated a radioisotope heat source 71, in which heat is generated and the large temperature gradient, duplex thermocouple system 1 of this invention for producing a high voltage milliwatt power output from a radioactive source. This RTG 11 is useful in space vehicles, such as space satellites, but it will be understood that this invention can be used in any application or location where electrical power is required.

The heat source 21, comprises a closed first capsule 23 and a tubular outer housing 25, each made of a refractory metal and an inner fuel pellet or cermet 27, such as strontium-90 titanate or plutonium-238. These capsules retain the radioactive fuel 27, enable winding and fabrication of the convertor 17 prior to insertion of the heat source 21, provide an electrically insulated surface 29 that supports the hot junctions 7 of the power generation coil 33, and transfers heat from the heat source 21 to the hot junctions 7. Advantageously the first fuel containing capsule 23, comprises an inner tantalum shell 35 and an outer Haynes-25 shell 37 separated by a very small helium filled space (not shown) and the outer fuel capsule housing comprises a 304 stainless steel shell 41 having a flame-sprayed alumina coating 29. This film sprayed ceramic surface is ground for the purpose of providing a smooth, straight surface on which to wind the thermocouple coil and to eliminate any poorly adhering coatings since the grinding operation tears away any weak layers of sprayed ceramic.

The case system 13, comprises a metallic cylinder 43 having closed ends 45 and 47 that are hermetically sealed to the cylinder 43 by heliarc welding after evacuation of the chamber 49 formed by the cylinder 43 and its ends to a vacuum of about 10 microns and the installation and connection of suitable ceramic insulated, electrical feed-throughs 51. The cylinder 43 and its ends 45 and 47 are advantageously aluminum and comprise the heaviest part of the generator, its weight being used as a large thermal capacity means on the cold side of the device to slow down the temperature fluctuations in the cold junctions 9 that tend to occur when ambient temperature changes occur rapidly. These elements, however, may alternately comprise beryllium, magnesium, copper or steel.

The converter 17 configuration tends to dictate the design of the thermal insulation system 15, which for ease of explanation is partially shown in FIG. 5. This thermal insulation 15 is a fine powder that fills the entire space in converter 17, including the voids between the turns of the duplex thermocouple coil system. Thus this insulation 15 must be compatible with the bare duplex thermocouple wire 1; i.e. it must be an electrical insulating powder so that adjacent turns of duplex wire are not short-circuited. It also must not contain chemicals that might cause corrosion or chemical reactions with any of the converter parts. Because of the requirements for minimizing generator weight and volume, the insulation must have a low specific gravity and an extremely low thermal conductivity. The insulation effectiveness must be "stable" for long periods of time and it is desirable that the insulation system be serviceable at temperatures well above the hot junction temperature. Finally, the insulation should not tend to mechanically damage the duplex wire or other converter parts during generator assembly or as a result of vibration and shock forces applied to the generator. Indeed, although not required, the insulation system adds physical support within the converter and helps to damp out vibratory impulses.

The insulation material selected is silica powder. One suitable silica powder is opacified with 35% by weight ferrosilicon powder. The minimum measured density of the opacified silica powder is 11.2 lbs./ft.$^3$ (after the insulation has been desulfonated and degassed). This is more than twice the loose bulk density of the as-received silica powder.

In the preparation of suitable insulation 15, ferrosilicon is ground in a mortar and pestle and made to pass through a 325 mesh sieve. The ferrosilicon and silica powders are dried in a vacuum oven to remove free moisture that tends to interfere with the blending of the opacifier into the silica powder. The silica powder is mixed with 35% by weight ferrosilicon in a rotary mixer. Pith balls in the mixer are used to insure that the silica does not clump together and that the ingredients are homogeneously blended.

The next step removes water and breaks down sulfur compounds in the silica powder. To this end the insulation 15 is placed in a quartz tube and heated at 1800–2000° F. in a tube furnace for at least 48 hours. The furnace is continuously evacuated to draw off the evolved contaminants especially sulfur and water vapors. The tube is continuously oscillated during heating so that agitation of the powders is provided that prevents sintering at the elevated temperatures. The insulation in the tube furnace is then cooled down to 70° F. and a mixture of 50% by weight zirconium hydride and 50% titanium hydride powders is then mixed into the silica ferrosilicon powders. Only about ½% by weight of the hydrides is required to serve as an efficient gettering material for any residual gases that may be evolved internally in the generator. Then the tube is again heated to 800–900° F. for about 30 minutes in order to decompose the hydrides to form highly activated zirconium and titanium powders dispersed throughout the insulation system. The generator is connected by tubing to the insulation which is being continuously evacuated. Following the activation of the gettering material the insulation can be transferred by gravity pouring into the bottom of the generator case through a tube which can ater be pinched off to completely seal the system in vacuum. The generator case is vibrated during the filling operation to ensure good packing of the powder into all interstices. This novel insulation 15 was specifically developed for a specific application of this invention described in more detail hereinafter.

The power generating component may be termed the convertor assembly 17, in accord with traditional usage. The main parts of the convertor are: (a) fuel capsule housing 25 suspended by (b) six high strength stainless steel wires 55 which are tied to (c) two cast aluminum end plates 57 and 59. These end plates are fastened together by (d) two cold posts 61 and 63. The center tap 65 is integral with one cold post (61) and the coil 33 end terminals 69 and 71 are part of the second cold post (63) assembly; (e) the duplex thermocouple wire 1 is wound in a single continuous strand around the two cold posts and the fuel capsule housing 25; (f) the terminal lid 45 provides a number of ceramic insulated feed-through pins 51 integrally bonded to the aluminum lid 45. The lid 45 is subsequently heliarc welded to the case cylinder 43 during the final assembly operations.

The convertor assembly 17 forms a functioning unit. When an electric heater is inserted in the fuel capsule housing 25 the convertor 17 can be checked for performance; i.e., output voltage and current can be measured. A completed and radioisotope fueled convertor 17 is sealed inside the case 13 with powdered thermal insulation 15 to complete the generator assembly 11.

The suspension wires 55, fan out symmetrically in a cone shaped configuration between each end of source capsule 25, end plates 57 and 59 respectively, which are closely fitted to cylinder 13 and ends 45 and 47 for suspending the convertor 17 and its source capsule 25 therein. These wires 55 have a low thermal conductivtiy and high tensile strength at elevated temperatures whereby they effectively insulate the source capsule 25 so that there is little heat transfer from the heat source 21 to the case 13. This wire arrangement and the arrangement of thermocouple system 1 on two cold posts 61 and 63 permits the insertion of the source capsule 25 after the thermocouples are assembled. One suitable high temperature wire material is AMS 355 stainless steel. The wires 55 pass through closely wound helical springs 81 attached to the plates 57 and 59. These springs provide guide tubes with multiple points of contact for the wires 55 to reduce stresses and vibration in the wires 55 and source capsule 25. Advantageously, the coil springs are coated with a dry lubricant, such as molybdenum disulfide. The end plates function to locate and hold the two cold posts 61 and 63 to anchor suspension wires 55, to provide locating surfaces for the anodes used in electropolishing to remove the desired portion of the cladding 6; to provide structure for attachment of the convertor frame to the terminal lid 45; and to transfer heat from the cold posts 61 and 63 to the case 13. These end plates 57 and 59 are advantageously fabricated by investment casting, and anodized to provide an electrically insulating coating.

In the two cold posts 61 and 63, shown in FIGS. 7a and 7b, the center tap 65 is integral with one post (e.g. post 61) and the other cold post carries the other two generator terminals 69 and 71. The functions of the cold posts 61 and 63 are to tie together the convertor 17 into a rigid structural unit; to transfer the small amounts of heat that there is from the duplex thermocouple coil 33 of this invention to the convertor end plates 57 and 59 so as rapidly to reject this heat to the case 13; to provide electrical insulation between adjacent turns of the thermocouple coil 33; and to provide structural rigidity so that the thermocouple coil 33 can be wound with sufficient tension to maintain wire spacing under all conditions of use. Both cold posts 61 and 63 are made of type 303 stainless steel selected for stiffness, resistance to electropolishing solution, adhesion to a sprayed polytetrafluoroethylene coating used for electrical insulation, and high strength tapped threads that fasten the cold posts to the end plates 57 and 59. The center tap 65 is made of silver plated copper to obtain a surface to which the center tap lead wire may be readily brazed. Approximately 15 turns of duplex wire are wrapped around the center tap 65 after electropolishing, which removes the cladding from the core to produce the unclad thermocouple portions 4 and the center tap wires are coated with silver paint that cures to lock the wires in place. A polytetrafluoroethylene coating is applied to the cold posts in six coats, each about .0005 inch thick, to make a total thickness of .003 inch. The initial coat acts as a primer. The cover coats are TFE-fluorocarbon green enamel. The coating procedure is such that it is extremely unlikely that any pinholes or porosity will be obtained.

The duplex thermocouple wire used has an outside diameter of .0019 inch. Although it is relatively strong for its size, with an average breaking strength of 125 grams at room temperature, great care must be exercised in the design of terminations of the coil. One suitable type of mechanical terminal shown in FIGURES 8a, 8b and 8c. This terminal consists of an eyelet 91, a tab 93 which is soldered to the eyelet, and a post 95 which is wedged into the eyelet at assembly to retain the fine wire. The heavy lead wire which connects to the terminal lid is soldered to the tab. The advantages of this terminal are: Minimization of possibilities of damage to the fine wire (compared to soldering or welding); low contact resistance obtainable (50–100 microohms); facilitates assembly of the coil. Operations are simpler and faster than soldering for attachment of fine wire.

Eyelet 91, post 95 and tab 93 are plated with .0001 inch of tin for good electrical conductivity and ease of soldering. The termination is designed to withstand military vibration schedules. In vacuum, at the temperature of operation, gradual diffusion will take place between the soldered tin-plated surfaces, thereby further improving the integrity of the connection.

These terminals are assembled in insulating lugs 97. The lugs are made of .060 inch thick fiber glass-silicone base sheet, NEMA grade G-7. This material is an excellent insulator, resists attack by electropolishing acids and is stable in vacuum at temperatures up to 200° F.

The center voltage tap 65 in the thermoelectric converter 17 causes about 15 turns of the thermocouple wire to be shunted out electrically. Therefore, in order to have N active couples, it is necessary to provide $$\left(\frac{N}{2}+15\right)$$

turns of thermocouple wire.

FIGURE 9 is a wiring diagram of the radioisotope heated generator 11 wherein connections 101 and 103 provide the cold junction temperature and the center tap outlet, connections 105 and 107 provide the hot junction temperature and connections 109 and 111 provide the generator outputs. For testing, it is desirable to provide a hot junction measuring thermocouple of Chromel-Alumel so that the fuel temperature can be monitored (indirectly) under all test conditions. A cold junction thermocouple pair of Chromel-Alumel is connected at the center tap to be used in observing generator temperature changes during ambient temperature transients. The Chromel-Alumel pairs are 36 gauge wire and the generator leads are 28 gauge tin-plated copper wire.

For one particular mission, winding and electropolishing has shown that advantageously the maximum number of turns of duplex wire should not exceed about 320 with the present envelope dimensions. Also, for the following table, it is seen that the minimum hot junction temperature to satisfy the coil winding criterion is about 775° F.; also minimum total heat flow is estimated to occur for $T_h=875°$ F. :

| $T_h$, °F. | $\Delta T$, °F. | Efficiency $\eta_{TE}$, percent | N couples | Total Turns [1] | $d_1$, mils [2] | $d_2$, mils | Clearance between Turns, mils |
|---|---|---|---|---|---|---|---|
| 900 | 700 | .370 | 470 | 250 | 1.20 | 2.00 | 4.00 |
| 875 | 675 | .347 | 494 | 262 | 1.24 | 2.06 | 3.67 |
| 850 | 650 | .316 | 524 | 278 | 1.27 | 2.12 | 3.24 |
| 800 | 600 | .277 | 585 | 307 | 1.35 | 2.24 | 2.65 |
| 750 | 550 | .239 | 655 | 342 | 1.42 | 2.37 | 2.05 |
| 700 | 500 | .207 | 740 | 385 | 1.51 | 2.51 | 1.38 |

[1] Total Turns=2N+15, includes 15 turns on center tap.
[2] Mils=Thousandths of an inch.

From this data the allowable tolerances on the core and outside diameter of the duplex wire is determined to be: range of core sizes, from 1.20 to 1.35 mils; range of outside diameter, from 2.00 to 2.24 mils; optimum ratio of O.D./I.D., 1.67. It is also determined that the thermoelectric efficiency decreases more strongly as cladding thickness is increased above an optimum, rather than vice versa. Therefore, it is preferred that the tolerance on the O.D./I.D. ratio be negative; i.e., the desired O.D./I.D. ratio should be in the range 1.63–1.67.

In the method for producing the clad thermocouple wire, the clad wire is made by standard procedures, comprising inserting a rod of the core material at a conviently large size into a tube of cladding material of close-fitting inner diameter and having an outer diameter such that the correct cladding ratio is obtained. The composite assembly is then cold-drawn through progressively smaller wire drawing dies until the wire is reduced to the finished size.

The core alloy rod is furnished in 15″ straight lengths of 0.200″ diameter. 12″ lengths of the Cupron Special cladding bar stock at ⅝″ diameter are bored through lengthwise on a rifle-boring lathe to an inside diameter of 0.210″. The outer diameter is then turned to about 0.300″ diameter concentric with the inner diameter.

After the rod and tube are thoroughly cleaned and degreased, the rod is inserted in the tube and a standard drawing process begun. The early reductions are accomplished on slow-speed, heavy-pull, single die drawing equipment, using dry soap lubricant, until the work piece has been greatly lengthened, is easily coiled and die pull forces are reduced. The wire end must be pointed; that is, a tapered section formed, before it can be inserted in a die. This pointing is done by cold swaging at the larger sizes, while electropolishing in hot acid is used for fine wire. The early reductions are more effective on the outer tube, which is lengthened and snugged down to form a tight pressure bond on the core rod. Cemented tungsten carbide dies are used for drawing wire sizes down to 0.30″ diameter, and diamond insert dies are then used for smaller sizes.

The intermediate size reductions are performed on standard multiple die benches with oil lubricant, the wire passing continuously through as many as six dies. The pulling force is applied by capstans rotating at increased speeds as the wire travels faster because of its lengthening as its area is reduced. The standard final fine-wire drawing machines pull the wire through as many as 20 dies lubricated with aqueous soap solution.

During drawing the wire is work-hardened and must be given intermediate anneals to restore ductility for further working. The wire is also annealed after drawing to finished size, as a soft wire lies better and is free from kinking in the coil winding process. The wire is softened by standard strand annealing, being pulled in a continuous length through a protective atmosphere in a small diameter tube of a long furnace. Annealing temperature is 1650° F.

The reduction of area in the drawing process results in a length of wire about 25,000 feet from the original work piece one foot long. Wire lost or damaged in pointing may amount to 50% of the total length, and careful inspection of finished wire by metallography is performed to locate damaged sections.

It will be seen that the thermocouple wire of this invention is intermittently and selectively electroplated to provide two materials relatively opposite in the sign of their thermocouple EMF. Moreover, the in situ preparation of this thermocouple is an important aspect of this invention since it would be difficult to produce the electropolished or electroplated couples on lengths of straight wire and then to wind the intermittently clad wire closely and with relatively sharp bend radii on the converter frame. This is because of an inevitable tolerance buildup on the lengths of the intermittently clad sections would cause all the junctions to appear in the wrong positions; and, the polished sections would be much less flexible than the original unpolished wire and would tend to break more easily in the winding operation.

In accordance with this invention the converter assembly is inserted in a suitable acid electropolishing solution and a 1.4 volts anode-cathode potential are maintained by a suitable D-C power supply for 60 minutes on the portion of the thermocouple coil 33 from which the cladding 6 is to be removed. This removes the cladding as desired after which the whole assembly is ultrasonically cleaned in water and then in acetone. Then the convertor is neutralized to remove residual polishing acids in $NH_4OH$ (pH=11 to 12) for 3 minutes and rinsed in water, methyl alcohol and acetone for two minutes each. Drying is then accomplished by infra-red heating.

In operation it has been found that the generator output and efficiency increase as ambient 113 temperature decreases, and that the design value of $T_h$=900° F. (upper limit), which limit applies to SNAP-15B only and is dictated in this case by the nature of the radioisotope selected, is therefore, a conservative design value for producing the design output of 5.5 volts at 240 μamps at an ambient 113 temperature of 165° F. or less. Also, the heat source 21 in its capsule 41 and housing 25 form a hot post that expands so as to tension the thermocouple wire on the hot post. The radioactive pellets thus are easily handled and efficiently heat the hot junctions 7 to produce a high thermoelectric output between the hot junctions 7 and cold junctions 9 for long operating periods.

The parameters in tabular form for one example of this invention are as follows.

Component: Operating condition
  Hot junction temperature _____ 900° F.
  Cold junction temperature _____ 200° F.
  Max. Seebeck coeff. $(\alpha_n+\alpha_p)$ __ 86 μv./° C.
  Seebeck coeff. assumed for calc. _ 77.5 μv./° C.
  Max. figure of merit _____ $.0466\times10^{-3}$/° C.
  Assumed figure of merit _____ $.0386\times10^{-3}$/° C.
  Max. thermoelectric efficiency __ .45%.
  Assumed thermoelectric efficiency _____ .37%.
  Optimum core diam.

| | |
|---|---|
| (L=1.179") | 1.20 mils. |
| Optimum O.D. sheath | 2.00 mils. |
| No. of couples, $V_L$=5.5 v., $I_L$=240 μa. | 470. |
| No. of turns (incl. center tap) | 250. |
| Heat conduction thru couples | 380 mw. |
| Estimated insulation heat loss | 600 mw. |
| Total heat flow | 980 mw. |
| Max. power output | 1.32 mw. |
| Overall thermal efficiency | .135%. |

Figure 10:
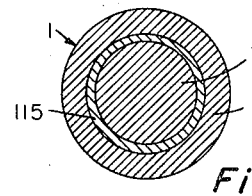
FIG. 10 is a partial cross-section of another embodiment of the clad thermocouple wire of FIG. 4.

In another embodiment, the duplex thermocouple of this invention comprises a clad portion having a thin diffusion barrier 115 between the core 5 and cladding 6 as shown in FIG. 10. The principal effect of this diffusion barrier 115 is to act as a heat shunt from the hot post to the cold posts. The amount of heat shunted through the diffusion barrier can readily be found from a heat conduction equation. The thermoelectric efficiency can then be found by dividing the electrical power output by the total thermal input to the T/C wires. Suitable materials for this diffusion barrier, comprise: palladium, rhenium, zirconium, carbon and graphite. In this regard palladium is an excellent diffusion barrier which reduces the thermoelectric efficiency $\eta_{T/E}$ from .446% to only .438%. It was also found from isothermal diffusion tests that although the combination of #20 alloy core and cupron cladding did not require a diffusion barrier for 900° F. operation, the diffusion barrier is advantageous for operation levels higher than 1000° F. over five years or longer periods without degrading thermoelectric performance.

Referring to FIG. 11, in another embodiment two independent duplex coils 301 and 303 are wound on the same set of posts 61 and 63. The application of this arrangement is where higher voltages and/or higher power is required in the same space as before. Since the insulation (thermal) is unchanged, the overall thermal efficiency is increased with no apparent extra problem in electropolishing. The insulating spacers 305 can be made of any non-porous ceramic or ceramic coated metal and the spacers can be screwed to the existing hot and cold posts. Suitable masking and silver painting procedures are used to insure current contact to both coils 301 and 303. This embodiment has the advantage and utility of providing multiple voltages from the generator; obtaining a center tap; shortening the generator case; matching two different loads and ambient temperature compensation in a radiation pyrometer use. Coils 301, 303 and 33 are equivalent.

It will be understood from the above that the fuel capsule suspension design of this invention effectively conserves the heat of a radioactive source and it is not necessary to rely on the thermal insulation or the duplex thermocouple coil mechanically to support the fuel source unaided. Very high strength, low thermal conductance support wires are utilized to this end and are tensioned in an assembly that permits the duplex wire to carry a negligible portion of the combined weight of the fuel capsule and fuel housing.

It will also be understood that the series jointless thermocouples of this invention may be utilized to energize clock movements, to trickle charge chemical batteries, to measure radiant power of solar sources, for fire detection where the radiant power is focussed on the hot post, for anemometry and gas flow measurement in the manner now used with heated coils and for the measurement of vacuum and other like uses.

This invention has the advantage of providing a low weight RTG generator, minimizing expensive radioactive inventory while providing reliable operation at significantly high temperature levels for long operating periods. This invention thus results in an efficient device that requires low, radioisotope thermal power, e.g. only one watt for a 5.5 volt, 240 μamp electrical output. Additionally, this invention provides specific novel features comprising novel duplex thermocouples, which provide up to hundreds of thermocouples in series without a single welded, brazed or twisted joint between wires, junctions being formed by intermittently and selectively electropolishing clad wire or intermittently electroplating unclad wire, a novel sealed-off high temperature vacuum thermal insulation system, a novel low heat conductance fuel capsule suspension and a fine wire termination and connector.

What is claimed is:

1. A thermoelectric generator, comprising two opposite end plates separated by a cylindrical container, a radioisotope fuel capsule forming a single hot post and said end plates having insulating means between said hot post and said end plates comprising thin, high strength steel wires between the hot post and end plates having springs with multiple points of contact with the steel wires to reduce stresses and vibration in the steel wires, two electrically insulated cold posts on opposite sides of said hot post between said end plates; and series connected, sequentially clad, duplex thermocouple wire wound in a single continuous spiral having a plurality of adjacent spaced coils around the cold posts and tangent to the hot post whereby each coil of said wire forms two thermocouples having hot junctions on said hot post and cold junctions on said opposite end posts for producing electromotive forces in said wire while said source heat is conserved to produce a large temperature gradient across said thermocouples for providing a high voltage output therefrom.

2. The invention of claim 1 in which said insulating means, comprises thin, high strength steel wires between the hot post and end plates having close wound helical springs and a dry lubricant between the spring coils for providing guide tubes with multiple points of contact with the steel wires to reduce stresses and vibration in said steel wires.

3. A thermoelectric generator for producing high voltage, milliwatt power, comprising an evacuated, thermal insulation containing, cylindrical container having opposite ends and two posts spanning the distance between said container ends and adjacent the inside diameter of said container, series connected thin cross-section, duplex thermocouple wire wound in spaced apart windings forming a continuous spiral around said posts with cold junctions thereon and hot junctions therebetween, a radioactive material containing, cylindrical heat source means having opposite ends and an outside cylindrical surface with said in contact therewith under tension and tangent thereto on the inside of said spiral, and high strength, low thermal conductivity supporting means for the opposite ends of said source means having resilient mountings that are selectively attachable and removable at the opposite ends of said container for removably centering the source means in said container and in said spiral to contact said hot junctions with said source means with low stresses and vibration in said supporting means for providing a large, high voltage, millivolt producing temperature gradient in said thermocouple wire between said hot and cold junctions.

References Cited

UNITED STATES PATENTS

| | | | |
|---|---|---|---|
| 813,682 | 2/1906 | Wilderman et al. | 136—201 X |
| 2,562,696 | 7/1951 | Canada | 136—226 |
| 2,580,293 | 12/1951 | Gier et al. | 136—226 X |
| 2,913,510 | 11/1959 | Birden et al. | 136—202 |
| 3,026,363 | 3/1963 | Batteau | 136—226 |
| 3,174,920 | 3/1965 | Post. | |

ALLEN B. CURTIS, *Primary Examiner.*